United States Patent [19]

Kouno et al.

[11] Patent Number: 4,785,069
[45] Date of Patent: Nov. 15, 1988

[54] PREPARATION PROCESS OF HEAT-RESISTANT POLYMERS FROM POLYCARBOXYLIC ACIDS OR ANHYDRIDES IN THE PRESENCE OF AN ALKALI METAL FLUORIDE AND QUATERNARY ONIUM SALT

[75] Inventors: Masahiro Kouno, Manazurumachi; Akihiro Yamaguchi, Kamakura; Masanori Osawa, Yokohama; Kohei Shizuka, Fujisawa; Hiromi Nakano, Zushi; Kazumi Mizutani, Yokohama, all of Japan

[73] Assignee: Mitsui Toatsu Chemicals, Incorporated, Tokyo, Japan

[21] Appl. No.: 139,600

[22] Filed: Dec. 29, 1987

Related U.S. Application Data

[62] Division of Ser. No. 943,699, Dec. 19, 1986, Pat. No. 4,736,008.

[30] Foreign Application Priority Data

Dec. 28, 1985 [JP] Japan ................................ 60-293592
Dec. 28, 1985 [JP] Japan ................................ 60-293593

[51] Int. Cl.$^4$ ...................... C08G 18/08; C08G 18/22

[52] U.S. Cl. ...................... 528/51; 528/52; 528/53

[58] Field of Search .............................. 528/51, 52, 53

[56] References Cited

U.S. PATENT DOCUMENTS

| | | | |
|---|---|---|---|
| 3,020,262 | 2/1962 | Speranza | 528/57 |
| 3,487,095 | 12/1969 | Nannelli et al. | 528/57 |
| 3,702,839 | 11/1972 | Glasgow et al. | 528/51 |
| 3,725,319 | 4/1973 | Frisch | 528/57 |
| 4,001,186 | 1/1977 | Onder | 528/57 |
| 4,061,623 | 12/1977 | Onder | 528/57 |
| 4,499,253 | 2/1985 | Kerimis et al. | 528/45 |
| 4,656,200 | 4/1987 | Clubley et al. | 525/51 |

Primary Examiner—Harold D. Anderson
Assistant Examiner—Dennis R. Daley
Attorney, Agent, or Firm—Oblon, Fisher, Spivak, McClelland & Maier

[57] ABSTRACT

Disclosed herein is a process for preparing heat-resistant polymers by reacting an organic polyisocyanate with one or more compounds selected from the group consisting of organic polycarboxylic acids and organic polycarboxylic acid anhydrides in the presence of an alkali metal fluoride or an alkali metal fluoride combined with a quaternary onium salt as a catalyst.

9 Claims, No Drawings

PREPARATION PROCESS OF HEAT-RESISTANT POLYMERS FROM POLYCARBOXYLIC ACIDS OR ANHYDRIDES IN THE PRESENCE OF AN ALKALI METAL FLUORIDE AND QUATERNARY ONIUM SALT

This is a division of application Ser. No. 06/943,699, filed Dec. 19, 1986, now U.S. Pat. No. 4,736,008, issued Apr. 5, 1988.

FIELD OF THE INVENTION

This invention relates to a preparation process of heat resistant polymers from an organic polyisocyanate and an organic polycarboxylic acid or polycarboxylic acid anhydride.

These polymers are excellent in heat insulating properties, radiation resistance, thermal dimensional stability, mechanical properties, electrical properties, chemical resistance, flame retardancy as well as in heat resistance. They can thus find a wide variety of applications in high performance industrial materials such as various industrial materials, radiation shield, composite materials, reinforcing materials and electrical insulating materials. They can be used further as mold articles, films, papers, fibers, vanishes, adhesives and the like in the field of electrical and electronic appliances, automobile, vehicles, aircraft, apparel and interior-finishing materials.

DESCRIPTION OF THE PRIOR ART

It has been well known to prepare heat resistant polymer by reacting organic polyisocyanates with organic polycarboxylic acids or organic polycarboxylic acid anhydrides. However, it has generally been difficult to obtain polymers of such high molecular weights as to exhibit sufficient properties for forming the polymers into fibers, films, molded articles and the like. Therefore, most of the applications of the resulting polymers have been limited to those as adhesives, vanishes and similar materials. Further, the process involved such problems that polyisocyanates used in the reaction gave rise to various side reactions particularly at high temperatures upon reaction, thereby causing a frequent formation of gels during the reaction or deteriorating the heat resistance and other properties of the resulting polymers due to the contamination of by-products into the polymers. Accordingly, a variety of catalysts have been developed for use in the aforesaid reaction system. By way of example, there may be mentioned (1) processes making use of metal alkoxides and metal phenoxides (U.S. Pat. Nos. 4,001,186, 4,061,611 and 4,061,623), (2) processes in which lactamates are used (U.S. Pat. Nos. 4,021,412, 4,094,864 and 4,094,866), (3) a process relying upon cyclic phosphorus oxides (U.S. Pat. No. 4,156,065), (4) a process in which alkali metal salts of polycarboxylic acids are used (Japanese Patent Laid-Open No. 151615/1982), (5) a process making use of alkali metal carbonates or hydrogencarbonates (Japanese Patent Laid-Open No. 18629/1983), a process in which alkali metal hydroxides are used (Japanese Patent Laid-Open No. 67723/1983), and the like.

In spite of the use of the foregoing catalysts, however, the above-described processes are accompanied by such drawbacks that their reaction systems are liable, for example, to form gels frequently or to deposit polymerized isocyanates due to the side reactions of polyisocyanates. It has therefore been difficult to obtain linear high-molecular polymers and hence to obtain polymers of adequate properties.

SUMMARY OF THE INVENTION

It is an object of the present invention to provide a process for the preparation of linear high-molecular polymers, in the practice of which no gels are formed during the reaction and the side-reactions due to organic polyisocyanates are prevented.

DETAILED DESCRIPTION OF THE INVENTION

The present inventors have investigated into processes for the preparation of heat-resistant polymers by reacting organic polyisocyanates with organic polycarboxylic acids or organic polycarboxylic acid anhydrides, leading to completion of the present invention.

The present invention provides a process for the preparation of a heat resistant polymer which comprises reacting an organic polyisocyanate with one or more compounds selected from the group consisting of organic polycarboxylic acids or organic polycarboxylic acid anhydrides in the presence of an alkali metal fluoride or an alkali metal fluoride combined with a quaternary onium salt as a catalyst.

Any organic polyisocyanates known per se in the art may be used as the organic polyisocyanate useful in the practice of the process of the present invention. In particular, however, below-described ones may be exemplified. As diisocyanates may be mentioned those described in Japanese Patent Laid-Open No. 151615/1982, for instance, 1,2-diisocyanate ethane, cyclohexane-1,4-diisocyanate, 4,4'-methylenebis(cyclohexylisocyanate), m-xylenediisocyanate, phenylene-1,4-diisocyanate, phenylene-1,3-diisocyanate, tolylene-2,4-diisocyanate, tolylene-2,6-diisocyanate, diphenylmethane-4,4'-diisocyanate, diphenylether-4,4'-diisocyanate and 1,5-naphthalene-diisocyanate.

As the organic polycarboxylic acid or organic polycarboxylic acid anhydride useful in the practice of the process of the present invention may be exemplified below-described ones. Illustrative examples of the ( organic polycarboxylic acid may include those described in Japanese Patent Laid-Open No. 179223/1982 as follows; as dicarboxylic acids, for example, oxalic acid, malonic acid, succinic acid, glutaric acid, adipic acid, pimelic acid, suberic acid, azelaic acid, sebacic acid, telephthalic acid, isophthalic acid, hexahydrotelephthalic acid, diphenylsulfone-4,4'-dicarboxylic acid, biphenyl-4,4'-dicarboxylic acid, thiophene-2,5-dicarboxylic acid, pyridine-2,6-dicarboxylic acid, naphthalene-2,6-dicarboxylic acid, 4,4'-diphenylmethane-bis-trimellitic imide acid and 4,4'-diphenylether-bis-trimellitic imide acid; as tricarboxylic acids, for example, butane-1,2,4-tircarboxylic acid, cyclohexane-1,2,3-tricarboxylic acid, cyclopnetadienyl-3,4,4'-tricarboxylic acid, cyclopentadienyl-1,2,4-tricarboxylic acid, benzene-1,2,4-tricarboxylic acid, naphthalene-1,4,5-tricarboxylic acid, biphenyl-3,4,4'-tricarboxylic acid, diphenylsulfone-3,4,3'-tricarboxylic acid, diphenylether-3,4,3'-tricarboxylic acid and benzophenone-3,4,4'-tricarboxylic acid; as tetracarboxylic acid, for example, butane-1,2,3,4-tetracarboxylic acid, pentane-1,2,4,5-tetracarboxylic acid, cyclohexane-1,2,3,4-tetracarboxylic acid, benzene-1,2,4,5-tetracarboxylic acid, naphthalene-2,3,6,7-tetracarboxylic acid, biphenyl-3,3',4,4'-tetracarboxylic acid, benzophenone-3,3',4,4'-tetracarboxylic acid, diphenylether-3,3',4,4'-tetracarboxylic acid, diphenylsulfone-3,3',4,4'-tetracarboxylic acid, 2,2-bis(3,4-dicarboxyphenyl)propane, furan-2,3,4,5-tetracarboxylic acid and pyridine-2,3,5,6-tetracarboxylic acid.

As the organic polycarboxylic acid anhydride may be mentioned, for example, acid anhydrides derived from tricarboxylic acids, which individually contain one carboxyl group and one acid anhydride group in the molecule, and acid anhydrides derived from tetracarboxylic acids, which individually contain two acid anhydride groups or one acid anhydride group and two carboxyl groups in the molecule. Exemplary polycarboxylic acid anhydrides may include trimellitic acid anhydride, benzene-1,2,3-tricarboxylic acid anhydride, butane-1,2,3,4-tetracarboxylic acid dianhydride, pyromellitic acid dianhydride, diphenyl-3,3',4,4'-tetracarboxylic acid dianhydride, naphthalene-2,3,6,7-tetracarboxylic acid dianhydride, naphthelene-1,4,5,8-tetracarboxylic acid dianhydride, diphenylether-3,3',4,4'-tetracarboxylic acid dianhydride, diphenylsulfone-3,3',4,4'-tetracarboxylic acid dianhydride, diphenylketone-3,3',4,4'-tetracarboxylic acid dianhydride, 2,2-bis(3,4-dicarboxyphenyl)propane dianhydride, furan-2,3,4,5-tetracarboxylic acid dianhydride and pyridine-2,3,5,6-tetracarboxylic acid dianhydride.

As the alkali metal fluoride useful in the practice of the process of the present invention may be mentioned, for example, lithium fluoride, sodium fluoride, potassium fluoride, cesium fluoride and rubidium fluoride. In particular, potassium fluoride and rubidium fluoride are preferred.

Further, the aforesaid alkali metal fluorides may be used in combination with a quaternary onium salt represented by the following formula:

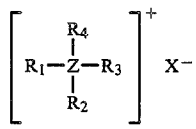

wherein Z represents nitrogen (N) or phosphorus (P), $R_1$, $R_2$, $R_3$ and $R_4$ represent an alkyl, cycloalkyl, aralkyl or aryl group, or adjacent two groups of $R_1$, $R_2$, $R^3$ and $R_4$ construct a structure of heterocyclic compound with the central atom Z or further with other hetero atoms, and X represents a halogen atom, a nitrile or hydroxyl group in the process of the present invention.

The quaternary onium salt will be described in more detail as follows: the alkyl group represented by $R_1$, $R_2$, $R_3$ and $R_4$ may include $C_1$-$C_{18}$ alkyl groups such as methyl, ethyl, propyl, butyl, heptyl, hexyl, dodecyl and octadodecyl groups; the cycloalkyl group may include $C_1$-$C_4$ alkyl-substituted cyclopentyl and cyclohexyl groups; the aralkyl group may include $C_1$-$C_4$ alkyl-, methoxy- or halogen-substituted benzyl groups; and the aryl group may include $C_1$-$C_4$ alkyl-, $C_1$-$C_{12}$ alkoxy- or halogen-substituted phenyl groups; a heterocyclic structure constructed with adjacent two groups of $R_1$, $R_2$, $R_3$ and $R_4$ and the central atom Z or further other hetero atoms such as O, S and N may include penta or hexa-heterocyclic structure, for example, pyrrolidine, piperidine and morpholine ring. As illustrative examples of the quaternary onium salt may be mentioned triphenylbenzylphosphoniumbromide, n-hexadecyltributylphosphoniumbromide, tetrabutylphosphoniumchloride, tetramethylphosphoniumhydroxide, tetraethylammonium chloride, tetraethylammoniumbromide, tetrabutylammoniumchloride, tetrabutylammoniumbromide, triethylbenzylammoniumchloride, cyclohexyloctyl dimethylammonium chloride, methylbutylpiperidinium iodide, tetraethylammoniumcyanide, benzyltrimethylammoniumcyanide, benzyltrimethylammoniumhydroxide.

The heat resistant polymers obtained from organic polyisocyanates and organic polycarboxylic acids or organic polycarboxylic acid anhydrides may be divided roughly as (1) those from organic polyisocyanates and organic polycarboxylic acids, (2) those from organic polyisocyanates and organic polycarboxylic acids & organic polycarboxylic acid anhydrides, and (3) those from organic polyisocyanates and organic polycarboxylic acid anhydrides, all of which are useful as heat-resistant polymers. The polymers according to (1) has a structure comprising amido groups; the polymers of (2) has a structure comprising amido groups and imido groups; and the polymers of (3) has a structure comprising imido groups.

The reaction according to the process of the present invention is effected by heating a mixture of an organic polyisocyanate, an organic polycarboxylic acid or organic polycarboxylic acid anhydride and an alkali metal fluoride or an alkali metal fluoride combined with a quaternary onium salt at a temperature of 20°-250° C. or preferably 100°-200° C. for 1-20 hours in an inert organic solvent in a substantially anhydrous state under the atmosphere of an inert gas such as nitrogen. The molar ratio of the organic polyisocyanate to the organic polycarboxylic acid or organic polycarboxylic acid anhydride to be used in the reaction should be in the range of 0.70-1.30, with the range of 0.95-1.10 being particularly preferred. Any ratios outside this range will fail to produce heat-resistant polymers of high molecular weight.

The total amount of the alkali metal fluoride or alkali metal fluoride combined with the quaternary onium salt to be used as the catalyst may preferably be in the range of 0.01-10 mole % relative to the total amount of the starting carboxylic acid or acid anhydride, with the range of 0.1-5 mole % being particularly preferred. Any amounts below this range will hardly produce polymers of high molecular weight, while any amounts in excess of this range will bring about problems of quality degradation, for example, deterioration of heat-resistance of polymers due to the catalyst residue remaining in the resultant polymers. Further, the amount of the quaternary onium salt to be used should be in the range of 1-500 mole %, preferably of 10-300 mole %, or more preferably of 30-200 mole % relative to the alkali metal fluoride.

The raw materials, i.e., the isocyanate and the carboxylic acid or acid anhydride and the catalyst, i.e., the alkali metal fluoride or alkali metal fluoride with the quaternary onium salt may be fed to the reaction system either simultaneously or in an arbitrary order. Usually, they may be fed thereto simultaneously at room temperature, optionally after dissolving the raw materials in a solvent in advance. In some cases, it is possible to add either one of the raw materials, i.e., the isocyanate or the carboxylic acid or acid anhydride, or preferably the isocyanate continuously to the reaction system at a given reaction temperature. The amount of the solvent to be used can be selected properly depending on the property of the final polymers and the reaction temperature. In general, it is preferable to choose such conditions as not to cause any substantial hindrance to the stirring due to increased viscosity in the course of the polymerization.

Useful organic solvents in the practice of the process of the present invention may include, for example, linear or cyclic amides or phosphorylamides such as N,N-dimethylacetamide, N,N-dimethylformamide, N-methylpyrolidone, Y-butyrolactone and hexamethylphosphoric acid triamide, sulfoxides or sulfones such as dimethylsulfoxide, diphenylsulfone and tetramethylenesulfone, ureas such as tetramethylurea and N,N'-dimethylethyleneurea, benzene, toluene, xylene, decalin, cyclohexane, heptane, hexane, pentane, methylene chloride, chlorobenzene, dichlorobenzene and tetrahydrofuran.

After completion of the polymerization, the polymer is separated as solid by introducing the reaction liquid into a non-solvent of the polymer thereby causing the polymer to precipitate. The polymer thus-precipitated is then washed well with a similar non-solvent to remove th remaining solvent and other impurities. After the washing, the polymer is dried at room temperature or at a high temperature, optionally under a reduced pressure. The resulting polymer may be subjected to melt molding, or in some cases, it may be re-dissolved in a solvent so as to be used as a vanish or adhesive or to produce a cast film and fiber. Further, the polymer solution itself may also be used as a spinning dope.

The process of the present invention will hereinunder be illustrated by the following examples. It should however be born in mind that the present invention is not limited by the following examples.

EXAMPLE 1

Charged in a 500-ml separable flask fitted with a stirrer, thermometer, condenser, dropping funnel and nitrogen inlet tube were 15.03 g (0.0905 mole) of terephthalic acid, 15.07 g (0.0907 mole) of isophthalic acid, 0.105 g ($1.8 \times 10^{-3}$ mole) of potassium fluoride and 412 ml of tetramethylenesulfone as a solvent. The resulting mixture was heated to 200° C., added dropwise with 31.72 g (0.1821 mole) of tolylene-2,4-diisocyanate over 2 hours, stirred further for additional 2 hours and allowed to cool down to room temperature. The mixture began to cause a polymer to precipitate in the course of the cooling and was turned into a substantial slurry at room temperature. The solid in the slurry was washed well with a large amount of methanol and dryed at 150° C. under a reduced pressure for 3 hours.

The logarithmic viscosity (inherent viscosity ($\eta_{inh}$) measured at a concentration of 0.1 g polymer/100 ml solvent and at a temperature of 30° C. using concentrated sulfuric acid as the solvent; the same shall apply hereunder) of the resulting polymer was 3.0. IR spectrum of the polymer revealed amido absorptions at 1,660 cm$^{-1}$ and 1,530 cm$^{-1}$.

A dope formed by dissolving the polymer in dimethylacetamide (10 wt. %) was cast on a glass plate and dryed at 50° C. under a reduced pressure for one hour. The film thus-formed was peeled off from the glass plate, fixed in a frame and dryed at 280° C. under a reduced pressure for 3 hours to obtain a tough, transparent, milky-white film. The tensile strength of the film was 1,210 kg/m² and its elongation was 15%. The Tg (glass transition temperature) of the film was 265° C. (according to the TMA method). The 5 wt. %-reduction temperature measured with a thermobalance (10 mg of sample were measured at a temperature increase rate of 10° C./min. in air) was 410° C.

EXAMPLE 2

Polymerization was carried out in the same manner as in Example 1 except that cesium fluoride was used in place of potassium fluoride. Post-treatment was conducted in the same manner as in Example 1 to obtain a milky-white polymer powder. The logarithmic viscosity of the polymer was 2.7, while the Tg of the film was 261° C.

COMPARATIVE EXAMPLE 1

Polymerization was carried out in the same manner as in Examples 1 and 2 except for the exclusion of the fluoride compound as a catalyst.

A mixture of 15.10 g (0.0909 mole) of terephthalic acid), 14.97 g (0.0901 mole) of isophthalic acid and 410 ml of anhydrous sulfolane was heated to 200° C., at which temperature 31.52 g (0.1810 mole) of tolylene-2,4-diisocyanate was added thereto dropwise over 2 hours. The reaction mixture was stirred further for additional 2 hours and thereafter allowed to cool down to room temperature. The polymer solution was emulsified in the course of the cooling and turned into a suspension at room temperature. The resulting suspension was introduced into a large amount of methanol, and the product was filtered, washed well with methanol and dryed at 150° C. under a reduced pressure for 3 hours. The polymer thus-obtained was a white fine powder which was a low-molecular polymer with a logarithmic viscosity of 0.33.

COMPARATIVE EXAMPLE 2

Polymerization was effected in the same manner as in Examples 1 and 2, using sodium methoxide in place of the fluoride compound as the catalyst.

A mixture of 14.96 g (0.0900 mole) of terephthalic acid, 15.11 g (0.0910 mole) of isophthalic acid, 0.0980 g (0.0018 mole) of sodium methoxide and 410 ml of anhydrous sulfolane was maintained at 200° C., at which temperature 31.57 g (0.1813 mole) of tolylene-2,4-diisocyanate was added thereto dropwise over 2 hours. After stirring for additional 2 hours, the mixture was allowed to cool down to room temperature and treated in the same manner as in Example 1 to obtain polyamide. The logarithmic viscosity of the polymer thus-obtained was 1.2. The Tg of the cast film prepared in the same manner as in Example 1 was 261° C., while the 5 wt. %-reduction temperature measured with a thermobalance was 390° C. The tensile strength was 950 kg/cm² and the elongation was 5%. These results were considerably inferior to those of the polyamide obtained in Example 1.

EXAMPLE 3

Polycondensation of polyamide-imide was carried out using a similar apparatus to that employed in Example 1. Charged in the apparatus were 20.05 g (0.1044 mole) of trimellitic acid anhydride, 0.0606 g ($1.04 \times 10^{-3}$ mole) of potassium fluoride and 300 ml of N,N'-dimethylethyleneurea and the resulting mixture was heated to 200° C. under stirring. To the mixture maintained at this temperature was added dropwise a solution formed by dissolving 26.26 g (0.1049 mole) of diphenylmethane-4,4'-diisocyanate in 50 ml of N,N'-dimethylethyleneurea over 4 hours. After proceeding with the reaction for additional 2 hours, the mixture wa allowed to cool down to room temperature. The resulting mixture was introduced into a great quantity of methanol to allow a polymer to precipitate. The polymer was filtered, washed well with a large quantity of methanol and dried at 150° C. under a reduced pressure for 3 hours.

The logarithmic viscosity of the resulting polymer was 1.12. IR spectrum of the polymer revealed imido group-based absorptions at 1,770 cm$^{-1}$ and 1,720 cm$^{-1}$ and amido group-based absorptions at 1,660 cm$^{-1}$ and 1,530 cm$^{-1}$.

The cast film prepared in the same manner as in Example 1 from a solution formed by dissolving the polymer in N-methylpyrolidone (10 wt. %) was a tough, light yellowish-green film with a tensile strength of 1,290 kg/cm$^2$, an elongation of 28% and a Tg of film of 262° C. The 5 wt. %-reduction temperature of the polymer was 465° C. according to the measurement with a thermobalance.

COMPARATIVE EXAMPLE 3

Polymerization of polyamide-imide was carried out in the same manner as in Example 3 except for the exclusion of potassium fluoride.

Charged in the flask were 20.01 g (0.1042 mole) of trimellitic acid anhydride and 250 ml of N,N'-dimethylethyleneurea and the resulting mixture was maintained at 200° C. A solution formed by dissolving 26.08 g (0.1042 mole) of diphenylmethane-4,4'-diisocyanate in 50 ml of N,N'-dimethylethyleneurea was added thereto dropwise over 4 hours. After proceeding with the reaction for additional 2 hours, the reaction mixture was allowed to cool down to room temperature. The resulting mixture was introduced into a great deal of methanol to allow a polymer to precipitate. The polymer was filtered, washed well with a large amount of methanol and dried at 150° C. under a reduced pressure for 3 hours.

The polymer thus-obtained was identified from IR spectrum to be polyamide-imide, which had a logarithmic viscosity of 0.23 and thus was of extremely low molecular weight. A solution containing the polymer dissolved in N-methylpyrolidone was cast on a glass plate, dried at 50° C. under a reduced pressure for one hour, increased in temperature to 300° C. under the reduced pressure, and dried at 300° C. under the reduced pressure for one hour to obtain a brownish transparent film. The film had a tensile strength of 390 kg/cm$^2$ and an elongation of 1.0% and thus was very brittle.

EXAMPLE 4

Polymerization of polyimide was carried out in a similar apparatus to that used in Example 1. Charged in the apparatus were 25.09 g (0.0779 mole) of benzophenone-3,3',4,4'-tetracarboxylic acid dianhydride, 0.0592 g (3.9×10$^{-4}$ mole) of cesium fluoride and 250 ml of N,N'-dimethylethyleneurea and the resulting mixture was maintained at 200° C. A solution containing 19.65 g (0.0779 mole) of diphenylether-4,4'-diisocyanate dissolved in 50 ml of N,N'-dimethylethyleneurea was added thereto dropwise over 2 hours, thereby causing a reaction. After proceeding with the reaction for additional 2 hours, the reaction mixture was allowed to cool down to room temperature. A portion of this polymer solution was introduced into a great deal of methanol to cause a polymer to coagulate. After sufficient washing, the polymer was dried at 150° C. under a reduced pressure for 3 hours to obtain a light yellowish powder o polyimide. The logarithmic viscosity of the polyimide was 1.24. Further, a portion of the polymer solution was cast on a glass plate and dryed in the same manner as in Example 1 to obtain a tough, transparent, light brownish film. The film had a tensile strength of 1,170 kg/cm$^2$ and an elongation of 53%.

COMPARATIVE EXAMPLE 4

Polymerization of polyimide was carried out in the same manner as in Example 4 except for the exclusion of cesium fluoride. To a mixture of 24.97 g (0.0775 mole) of benzophenone-3,3',4,4'-tetracarboxylic acid dianhydride and 250 ml of N,N'-dimethylethyleneurea maintained at 200° C. was added dropwise a solution containing 19.54 g (0.0775 mole) of diphenylether-4,4'-diisocyanate dissolved in 50 ml of N,N'-dimethylethyleneurea over 2 hours. After proceeding with the reaction for additional 2 hours, the reaction mixture was treated in the same manner as in Example 4 to obtain polyimide. This polymer had a logarithmic viscosity of 0.32 and thus was of very low molecular weight. Further, the polymer solution was cast on a glass plate, dryed at 50° C. under a reduced pressure for one hour, increased in temperature to 300° C. under the reduced pressure and dryed. The dryed film was however poor in film formability and too brittle to stand bending.

EXAMPLE 5

In the same separable flask as that used in Example 1 were charged 20.03 g (0.1206 mole) of terephthalic acid, 6.679 g (0.0402 mole) of isophthalic acid, 0.0467 g (8.0×10$^{-4}$ mole) of potassium fluoride, 0.3111 g (8.0×10$^{-4}$ mole) of triphenylbenzylphosphoniumchloride and 350 ml of anhydrous sulfolane. The resulting mixture was heated to 200° C., at which temperature 28.14 g (0.1616 mole) of tolylene-2,4-diisocyanate was added thereto dropwise over 2 hours. After proceeding with stirring for additional 2 hours, the reaction solution was allowed to cool down to room temperature. The solution began to cause a polymer to deposit in the course of the cooling and was turned into a substantial slurry at room temperature. The polymer was filtered, washed well with a great deal of methanol and dried at 150° C. under a reduced pressure for 3 hours to obtain a milky-white polymer powder. The logarithmic viscosity of the polymer thus-obtained was 3.3. IR spectrum of the polymer revealed amido absorptions at 1,661 cm$^{-1}$ and 1,530 cm$^{-1}$. The cast film prepared in the same manner as in Example 1 from the aromatic polyamide was transparent, milky-white and tough. Its tensile strength was 1,310 kg/cm$^2$ while its elongation was 14%. The glass transition temperature, Tg, of the film was 273° C. (according to the TMA method). The 5 wt. %-reduction temperature measured with a thermobalance was 412° C.

COMPARATIVE EXAMPLE 5

Polymerization was carried out in the same manner as in Example 4 except for the exclusion of the fluoride compound and the quaternary phosphonium salt as a catalyst.

A mixture of 20.14 g (0.1212 mole) of terephthalic acid, 6.713 g (0.0404 mole) of isophthalic acid and 350 ml of anhydrous sulfolane was heated to 200° C., at which temperature 28.17 g (0.1618 mole) of tolylene-2,4-diisocyanate was added thereto dropwise over 2 hours. After proceeding with stirring for additional 2 hours, the reaction solution was allowed to cool down to room temperature. The polymer solution was emulsified in the course of the cooling and turned into a suspension at room temperature. The suspension was introduced into a great quantity of methanol, and the product was filtered, washed well with methanol and dryed at 150° C. under a reduced pressure for 3 hours. The polymer thus-obtained was a white fine powder. It was a low molecular polymer with a logarithmic viscosity of 0.29.

COMPARATIVE EXAMPLE 6

Catalytic effects of the quaternary phosphonium salt alone were examined.

Polymerization of polyamide was effected using a similar apparatus to that employed in Example 1.

A mixture of 20.09 g (0.1209 mole) of terephthalic acid, 6.812 g (0.0410 mole) of isophthalic acid and 350 ml of anhydrous sulfolane was heated to 200° C., at which temperature 28.20 g (0.1619 mole) of tolylene-2,4-diisocyanate was added thereto dropwise over 2 hours. After proceeding with stirring for additional 2 hours, the reaction mixture was allowed to cool down to room temperature. The cooled mixture was an emulsion, which is then introduced into a large amount of methanol to cause the product to precipitate. The product was filtered, washed well with methanol and dryed at 150° C. under a reduced pressure for 3 hours. The resultant polymer was a fine white powder which was a low molecular polymer with a logarithmic viscosity of 0.43.

EXAMPLE 6

Polymerization of polyamide was effected using a similar apparatus to that employed in Example 1.

Charged in the apparatus were 18.06 g (0.1087 mole) of isophthalic acid, 6.211 g (0.0526 mole) of succinic acid, 0.2450 g ($1.6 \times 10^{-3}$ mole) of cesium fluoride, 0.6222 g ($1.6 \times 10^{-3}$ mole) of triphenylbenzylphosphoniumchloride and 350 ml of N,N'-dimethylethyleneurea. The mixture was heated to 200° C., at which temperature 28.09 g (0.1613 mole) of tolylene-2,4-diisocyanate was added thereto dropwise over 2 hours. The reaction mixture was subjected to the reaction for additional 2 hours. After cooling to room temperature, a portion of the resulting polymer liquid was introduced into a great amount of methanol, thereby causing the polymer to coagulate. The polymer was then washed well with methanol and dryed at 150° C. under a reduced pressure for 3 hours to obtain a milky-white polymer powder. The logarithmic viscssity of the polyamide was 1.5, while the 5 wt. %-reduction temperature measured with a thermobalance was 391° C. The Tg of the film prepared in the same manner as in Example 1 was 232° C.

COMPARATIVE EXAMPLE 7

Polymerization of polyamide was effected using sodium methoxide in place of cesium fluoride and triphenylbenzylphosphoniumchloride.

Charged in the apparatus were 17.89 g (0.1077 mole) of isophthalic acid, 6.181 g (0.0523 mole) of succinic acid, 0.0864 g ($1.6 \times 10^{-3}$ mole) of sodium methoxide and 350 ml of N,N'-dimethylethyleneurea. To the mixture maintained at 200° C. was added dropwise 27.88 g (0.1601 mole) of tolylene-2,4-diisocyanate over 2 hours. The reaction mixture was subjected to the reaction for additional 2 hours. The polymer solution thus-obtained was treated in the same manner as in Example 6 to obtain a polyamide powder. The polyamide had a logarithmic viscosity of 0.29 and thus was of extremely low molecular weight. The press sheet with a thickness of 0.5 mm, which had been prepared by heat-pressing the powder at 280° C. and 100 kg/cm$^2$ was too brittle to subject it to physical property measurements.

EXAMPLE 7

Polymerization of polyamide-imide was effected using a similar apparatus to that employed in Example 1. Charged in the apparatus were 20.11 g (0.1047 mole) of trimellitic acid anhydride, 0.1580 g (0.0010 mole) of cesium fluoride, 0.0930 g ($2.0 \times 10^{-4}$ mole) of n-hexadecyltributylphosphoniumchloride and 350 ml of anhydrous sulfolane. The mixture was heated to 200° C. with stirring under nitrogen atmosphere. To the mixture aintained at this temperature was added dropwise a solution containing 13.09 g (0.0523 mole) of diphenylmethane-4,4'-diisocyanate dissolved in 30 ml of anhydrous sulfolane for 2 hours. After proceeding with the reaction for additional one hour, a solution containing 9.126 g (0.0524 mole) of tolylene-2,4-diisocyanate dissolved in 20 ml of anhydrous sulfolane was added thereto dropwise over one hour. After proceeding further with the reaction for one hour, the reaction solution was cooled to room temperature. In the course of the cooling, the reaction solution started causing a polymer to deposit and clouding from about 150° C. and down and was turned into a slurry when cooled down to room temperature. The solid in the slurry was filtered, washed well with a large amount of water and then with methanol, and dryed at 150° C. under a reduced pressure for 3 hours. The logarithmic viscosity of the polymer thus-obtained was 1.33. IR spectrum of the polymer revealed imido-bond absorptions at 1,780 cm$^{-1}$, 1,720 cm$^{-1}$ and 1,370 cm$^{-1}$ and amido-bond absorptions at 1,670 cm$^{-1}$ and 1,530 cm$^{-1}$. The cast film prepared in the same manner as in Example 1 from a solution containing the polymer dissolved in N-methylpyrolidone (10 wt. %) was a tough and light yellowish-green film with a tensile strength of 1,170 kg/cm$^2$, an elongation of 17% and a Tg of film (according to the TMA method) of 283° C. Further, the 5 wt. %-reduction temperature measured with a thermobalance was 448° C.

COMPARATIVE EXAMPLE 8

Polycondensation of polyamide-imide was effected in the same manner as in Example 7 except that cesium fluoride and n-hexadecyltributylphosphoniumchloride were not used. The raw materials used were as follows: 20.08 g (0.1045 mole) of trimellitic acid anhydride, 13.09 g (0.0523 mole) of diphenylmethane-4,4'-diisocyanate, 9.091 g (0.0522 mole) of tolylene-2,4-diisocyanate and 400 ml of anhydrous sulfolane. The reaction solution was emulsified in the course of cooling. A portion of the resultant reaction mixture was introduced into a great amount of methanol to cause a polymer to coagulate. The polymer cake thus-obtained was then washed well with methanol and dryed at 150° C. under a reduced pressure for 3 hours to obtain a light yellowish polymer. The logarithmic viscosity of the polymer was 0.24.

EXAMPLE 8

Polymerization of polyimide was effected using a similar apparatus to that employed in Example 1.

Charged in the apparatus were 25.09 g (0.0779 mole) of benzophenonetetracarboxylic acid dianhydride, 0.0930 g (0.0016 mole) of potassium fluoride, 0.3467 g (0.0008 mole) of triphenylbenzylphosphoniumbromide and 300 ml of N,N'-dimethylethyleneurea. The mixture was heated to 200° C. with stirring under nitrogen atmosphere. To the mixture maintained at this temperature was added dropwise a solution formed by dissolving 9.748 g (0.0390 mole) of diphenylmethane-4,4'-diisocyanate in 20 ml of N,N'-dimethylethyleneurea over one hour. After proceeding with the reaction for additional one hour, a solution containing 6.775 g (0.0389 mole) of tolylene-2,4-diisocyanate dissolved in 20 ml of anhydrous N,N'-dimethylethyleneurea was added thereto dropwise over one hour. After proceeding further with the reaction for one hour, the reaction mixture was allowed to cool down to room temperature. The resulting reaction mixture was introduced into one liter of water under vigorous stirring. The precipitate thus-formed was filtered, washed well with water and then with methanol, and dried at 150° C. under a reduced pressure for 3 hours to obtain a light yellowish powder. The logarithmic viscosity of the polymer was 0.98. The tensile strength of the film prepared in the same manner as in Example 1 from a solution containing the polymer dissolved in N-methylpyrolidone was 1,090 kg/cm$^2$ and its elongation was 27%. The 5 wt. %-reduction temperature of the polymer measured with a thermobalance was 480° C.

COMPARATIVE EXAMPLE 9

Polymerization of polyamide-imide was effected in the same manner as in Example 8 except for the exclusion of potassium fluoride. The raw materials used were as follows: 24.97 g (0.0775 mole) of benzophenonetetracarboxylic acid dianhydride, 0.3111 g (8.0×10$^{-4}$ mole) of triphenylbenzylphosphoniumbromide, 9.685 g (0.0387 mole) of diphenylmethane-4,4'-diisocyanate, 6.757 g (0.0388 mole) of tolylene-2,4-diisocyanate, and 340 ml of anhydrous N,N'-dimethylethyleneurea. The polymer prepared by undergoing the same post-treatment as in Example 8 had a logarithmic viscosity of 0.29.

EXAMPLE 9

Polymerization of polyimide was effected using a similar apparatus to that employed in Example 1.

Charged in the apparatus were 20.15 g (0.1017 mole) of butanetetracarboxylic acid dianhydride, 0.1772 g (0.0030 mole) of potassium fluoride, 0.4316 g (0.0010 mole) of triphenylbenzylphosphoniumbromide and 350 ml of N,N'-dimethylethyleneurea. The mixture was heated to 200° C. under nitrogen atmosphere. To the mixture maintained at this temperature was added dropwise a solution formed by dissolving 17.73 g (0.1018 mole) of diphenylmethane-4,4'-diisocyanate in 50 ml of N,N'-dimethylethyleneurea over 2 hours. After proceeding with the reaction for additional 2 hours, the reaction mixture was allowed to cool down to room temperature. The reaction mixture was then introduced into one liter of water under vigorous stirring. The polymer thus-deposited was filtered, washed with a large quantity of water, and dryed at 150° C. under a reduced pressure for 3 hours to obtain a light yellowish powder. The logarithmic viscosity of the polyimide was 1.14 and the cas film prepared in the same manner as in Example 1 was tough and had a tensile strength of 890 kg/cm$^2$ and an elongation of 35%.

What is claimed is:

1. A process for preparing a heat-resistant polymer which comprises reacting an organic polyisocyanate with one or more compounds selected from the group consisting of organic polycarboxylic acids and organic polycarboxylic acid anhydrides in the presence of an alkali metal fluoride as a catalyst, wherein said alkali metal fluoride is used in combination with a quaternary onium salt represented by the following formula:

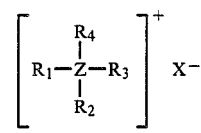

wherein Z represents a nitrogen atom or a phosphorus atom, $R_1$, $R_2$, $R_3$ and $R_4$ represent an alkyl, cycloalkyl, aralkyl or aryl group, or wherein any two adjacent $R_1$, $R_2$, $R_3$ or $R_4$ groups construct a structure of a heterocyclic compound with the central atom Z or further with other hetero atoms, and X represents a halogen atom, a nitrile or hydroxyl group.

2. A process as claimed in claim 1, wherein a polyamide is prepared by reacting an organic diisocyanate with an organic dicarboxylic acid.

3. A process as claimed in claim 1, wherein a polyamide or polyamide-imide is prepared by reacting an organic diisocyanate with a compound selected from the group consisting of organic tricarboxylic acids and tricaroxylic acid anhydrides.

4. A process as claimed in claim 1, wherein a polyamide or polyimide is prepared by reacting an organic diisocyanate with a compound selected from the group consisting of organic tetracarboxylic acids and tetracarboxylic acid dianhydrides.

5. A process as claimed in claim 1, wherein the alkali metal fluoride is potassium fluoride or cesium fluoride.

6. A process as claimed in claim 1, wherein the quaternary onium salt is a quaternary phosphonium salt.

7. A process as claimed in claim 6, wherein the phosphonium salt is triphenylbenzylphosphoniumbromide, n-hexadecyltributylphophoniumbromide or tetrabutylphosphoniumchloride.

8. A process as claimed in claim 1, wherein the quaternary onium salt is a quaternary ammonium salt.

9. A process as claimed in claim 8, wherein the quaternary ammonium salt is tetraethylammoniumchloride, tetraethylammoniumbromide, tetrabutylammoniumchloride, tetrabutylammoniumbromide, triethylbenzylammoniumchloride, cyclohexyloctyldimethylammoniumchloride, methylbutylpiperidiniumiodide, tetraethylammoniumcyanide, benzyltrimethylammoniumhydroxide.

* * * * *